US012724254B2

(12) United States Patent
Pan

(10) Patent No.: US 12,724,254 B2
(45) Date of Patent: Sep. 1, 2026

(54) MICROSCOPE OBJECTIVE

(71) Applicant: AAC OPTICS (CHANGZHOU) CO., LTD., Changzhou City (CN)

(72) Inventor: Shiqi Pan, Changzhou (CN)

(73) Assignee: AAC OPTICS (CHANGZHOU) CO., LTD., Changzhou City (CN)

( * ) Notice: Subject to any disclaimer, the term of this patent is extended or adjusted under 35 U.S.C. 154(b) by 430 days.

(21) Appl. No.: 18/399,772

(22) Filed: Dec. 29, 2023

(65) Prior Publication Data

US 2024/0345377 A1 Oct. 17, 2024

(30) Foreign Application Priority Data

Apr. 11, 2023 (CN) ......................... 202310383092.5

(51) Int. Cl.
*G02B 21/02* (2006.01)
*G02B 9/60* (2006.01)

(52) U.S. Cl.
CPC ............... *G02B 21/02* (2013.01); *G02B 9/60* (2013.01)

(58) Field of Classification Search
CPC . G02B 21/02; G02B 9/60; G02B 1/00; G02B 13/0015
USPC .......................................................... 359/368
See application file for complete search history.

(56) References Cited

U.S. PATENT DOCUMENTS 4,501,474 A * 2/1985 Kimura .................. G02B 21/02 359/764
2005/0007676 A1* 1/2005 Sharma .................. G02B 21/02 359/656

OTHER PUBLICATIONS

Matsuzawa et al. JP H08166540, Projecting Optical System (Year: 1994).*
Matthae et al. WO-2004095109-A1 Flat Apochromatic Microscope Lens, (Year: 2004).*

* cited by examiner

*Primary Examiner* — Bumsuk Won
*Assistant Examiner* — Rahman Abdur
(74) *Attorney, Agent, or Firm* — Wiersch Law Group

(57) ABSTRACT

A microscope objective, including from an exit pupil plane to an object plane: a first lens having a positive refractive power, a second lens having a negative refractive power, a third lens having a positive refractive power, a fourth lens having a negative refractive power, and a fifth lens having a positive refractive power; a focal length of the microscope objective is f, a focal length of the first lens is f1, a focal length of the second lens is f2, a focal length of the third lens is f3, an on-axis distance from the object plane of the microscope objective to an object side surface of the fifth lens is WD, a numerical aperture is NA, and a total optical length is TTL, following relational expressions are satisfied: $0.68 \leq f3/f \leq 2.00$; $-2.20 \leq f2/f1 \leq -1.40$; $0.15 \leq WD/TTL \leq 0.35$; $6.00 \leq f*NA \leq 9.00$. The microscope objective has the characteristics of low distortion, 1.5 times magnification and long operating distance.

9 Claims, 8 Drawing Sheets

MICROSCOPE OBJECTIVE

TECHNICAL FIELD

The disclosure relates to the field of camera optical lenses and, in particular, to a microscope objective applicable to devices such as a microscope.

BACKGROUND

In recent years, the demand for microscope lenses has been increasing, and general microscope lenses may have distortion within their microscopic range due to the constraints of their optical structures. On the other hand, due to the fact that the microscope lens is composed of multiple lenses, its length is inevitably affected. Long microscope lenses may also shorten their operating distance, and the magnification is also affected by the operating distance, which is not conducive to the use of operators.

With the development of technology and the increase of diversified needs of users, the requirements of scientific research on the observation quality of microscope lenses are continuously improving. There is an urgent need for microscope lenses with excellent optical characteristics, low distortion, high magnification, and long operating distance.

SUMMARY

The technical problem to be solved by the present disclosure is to provide a microscope objective, which can meet the requirements of low distortion and long operating distance while obtaining high imaging performance.

In order to solve the above technical problem, the present disclosure provides a microscope objective, sequentially including from an exit pupil plane to an object plane: a first lens having a positive refractive power, a second lens having a negative refractive power, a third lens having a positive refractive power, a fourth lens having a negative refractive power, and a fifth lens having a positive refractive power. A focal length of the microscope objective is f, a focal length of the first lens is f1, a focal length of the second lens is f2, a focal length of the third lens is f3, an on-axis distance from the object plane of the microscope objective to an object side surface of the fifth lens is WD, a numerical aperture of the microscope objective is NA, and a total optical length of the microscope objective is TTL satisfy following relational expressions: $0.68 \leq f3/f \leq 2.00$; $-2.20 \leq f2/f1 \leq -1.40$; $0.15 \leq WD/TTL \leq 0.35$; $6.00 \leq f*NA \leq 9.00$.

As an improvement, an Abbe number of the first lens is v1, and an Abbe number of the second lens is v2, a following relational expression is satisfied: $35.00 \leq v1-v2$.

As an improvement, a central curvature radius of an exit pupil surface of the fifth lens is R9, and a central curvature radius of an object side surface of the fifth lens is R10, a following relational expression is satisfied: $-5.00 \leq R10/R9 \leq -1.50$.

As an improvement, an exit pupil surface of the first lens is convex in a paraxial region, and an object side surface of the first lens is convex in a paraxial region. A central curvature radius of the exit pupil surface of the first lens is R1, a central curvature radius of the object side surface of the first lens is R2, and an on-axis thickness of the first lens is d1, following relational expressions are satisfied: $0.08 \leq f1/f \leq 0.29$; $-0.44 \leq (R1+R2)/(R1-R2) \leq -0.13$; $0.02 \leq d1/TTL \leq 0.11$.

As an improvement, an exit pupil surface of the second lens is concave in a paraxial region, and an object side surface of the second lens is convex in a paraxial region. An on-axis thickness of the second lens is d3, a central curvature radius of the exit pupil surface of the second lens is R3, and a central curvature radius of the object side surface of the second lens is R4, following relational expression are satisfied: $-0.74 \leq f2/f \leq -0.22$; $-3.86 \leq (R3+R4)/(R3-R4) \leq -0.71$; $0.01 \leq d3/TTL \leq 0.12$.

As an improvement, an exit pupil surface of the third lens is concave in a paraxial region, and an object side surface of the third lens is convex in a paraxial region. A central curvature radius of the exit pupil surface of the third lens is R5, a central curvature radius of the object side surface of the third lens is R6, and an on-axis thickness of the third lens is d5, following relational expressions are satisfied: $1.25 \leq (R5+R6)/(R5-R6) \leq 20.05$; $0.00 \leq d5/TTL \leq 0.02$.

As an improvement, a focal length of the fourth lens is f4, a central curvature radius of an exit pupil surface of the fourth lens is R7, a central curvature radius of an object side surface of the fourth lens is R8, and an on-axis thickness of the fourth lens is d7, following relational expressions are satisfied: $-0.37 \leq f4/f \leq -0.09$; $-6.00 \leq (R7+R8)/(R7-R8) \leq -0.65$; $0.01 \leq d7/TTL \leq 0.12$.

As an improvement, an exit pupil surface of the fifth lens is convex in a paraxial region, and an object side surface of the fifth lens is convex in a paraxial region. A focal length of the fifth lens is f5, a central curvature radius of an exit pupil surface of the fifth lens is R9, a central curvature radius of an object side surface of the fifth lens is R10, and an on-axis thickness of the fifth lens is d9, following relational expressions are satisfied: $0.21 \leq f5/f \leq 1.09$; $-1.33 \leq (R9+R10)/(R9-R10) \leq -0.13$; $0.01 \leq d9/TTL \leq 0.12$.

As an improvement, at least one of the first lens, the second lens, the third lens, the fourth lens and the fifth lens is made of glass.

The beneficial effect of the present disclosure lies in the excellent optical performance of the microscope objective according to the present disclosure, as well as the characteristics of low distortion, 1.5 times magnification, and long operating distance, especially suitable for optical microscope objectives.

DESCRIPTION OF EMBODIMENTS

The following is a clear and complete description of the technical solutions in embodiments of the present disclosure. It is appreciated that, the described embodiments are only a part of the embodiments of the present disclosure, not all of them. Based on the embodiments in the present disclosure, all other embodiments obtained by those skilled in the art without creative efforts belong to the protection scope of the present disclosure.

Embodiment 1

Figure 1:
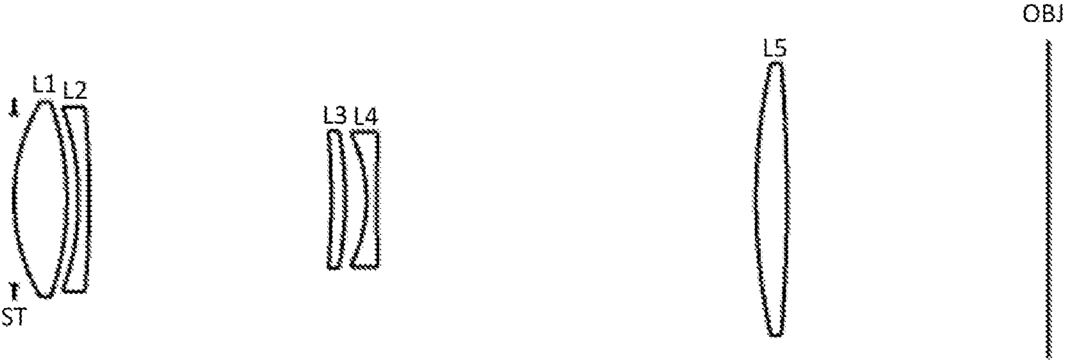
FIG. 1 is a schematic structural diagram of a microscope objective according to a first embodiment of the present disclosure.

Referring to the drawings, the present disclosure provides a microscope objective 10. FIG. 1 shows a first embodiment of a microscope objective 10 including five lenses. The microscope objective 10 sequentially includes from the exit pupil to the object side: an aperture ST, a first lens L1, a second lens L2, a third lens L3, a fourth lens L4, a fifth lens L5, and an object plane OBJ.

The focal length of the entire microscope objective 10 is defined as f, and the focal length of the third lens L3 is defined as f3, and f, f3 satisfy the following relational expression: $0.68 \leq f3/f \leq 2.00$, which specifies a ratio of the focal length of the third lens L3 to the total focal length of the system. The relational expression can effectively control the total length of the optical system while correcting the aberration to ensure the imaging quality.

A focal length of the first lens L1 is defined as f1, and a focal length of the second lens L2 is defined as f2, and f1, f2 satisfy the following relational expression: $-2.20 \leq f2/f1 \leq -1.40$, which specifies a ratio of the focal length of the second lens to the focal length of the first lens. By reasonably distributing the optical focal length of the distribution system, the system has better imaging quality and lower sensitivity.

An on-axis distance from the object plane OBJ of the microscope objective 10 to the object side surface of the fifth lens is defined as WD, and a total optical length of the microscope objective 10 is defined as TTL, WD and TTL satisfy the following relational expression: $0.15 \leq WD/TTL \leq 0.35$. The total optical length of TTL is a distance from the object to the lens surface closest to the aperture along the optic axis. If the ratio is lower than the lower limit value of the relational expression, the distance between the microscope objective 10 and the object is too narrow, and the microscope using this objective has poor operability. On the contrary, if the ratio is higher than the upper limit of the relational expression, the space occupied by the lens part is insufficient, so that the configurable thickness and optical path of the lens are limited, making it difficult to correct spherical aberration and chromatic aberration.

The numerical aperture of the microscope objective 10 is defined as NA, and f, NA satisfy the following relational expression: $6.00 \leq f^*NA \leq 9.00$. The relational expression relates to the field of view and the brightness of the image that can be observed by using the microscope objective 10. If the value is lower than the lower limit, the magnification of the microscope objective 10 is inevitably increased, and the field of view that can be observed is narrowed. If the value is higher than the upper limit, the microscope objective 10 becomes larger, and it is difficult to maintain the focal length of the microscope objective 10.

An Abbe number of the first lens is v1, and an Abbe number of the second lens is v2, v1, v2 satisfy the following relational expression: $35.00 \leq v1-v2$. The value within this range can effectively correct the chromatic aberration of the system, where $|LC| \leq 5$ μm.

A central curvature radius of the exit pupil surface of the fifth lens is R9, and a central curvature radius of the object side surface of the fifth lens is R10, satisfying the following relational expression: $-5.00 \leq R10/R9 \leq -1.50$, which specifies the shape of the fifth lens L5, and the degree of deflection of the light passing through the lens can be improved within the range, which is beneficial to correcting the aberration and distortion of the microscope objective lens, making the distortion $|Distortion| \leq 0.2\%$, and reducing the possibility of dark angles.

When the focal length of the microscope objective 10, the focal length of each lens, the total optical length of the microscope objective 10, the operating distance, the on-axis thickness, the numerical aperture, the Abbe number of each lens and the central curvature radius meet the above relational expressions, the microscope objective 10 can meet the design requirements of low distortion, 1.5 times magnification and long operating distance.

In this embodiment, the exit pupil surface of the first lens L1 is convex in the paraxial region, and the object side surface of the first lens L1 is convex in the paraxial region. The first lens L1 has a positive refractive power.

The focal length of the first lens L1 is defined as f1, and f1, f satisfy the following relational expression: $0.08 \leq f1/f \leq 0.29$, which specifies the positive refractive power of the first lens L1. When the ratio is lower than the lower limit, although it is beneficial for the ultra-thin design of the lens, the positive refractive power of the first lens L1 may be excessive, making it difficult to correct the problem such as aberration, and it is not beneficial for the wide-angle design of the lens. On the contrary, when the ratio is greater than the upper limit, the positive refractive power of the first lens becomes too less, making it difficult for the ultra-thin design of the lens. Optionally, $0.14 \leq f1/f \leq 0.23$.

A central curvature radius of the exit pupil surface of the first lens L1 is R1, and a central curvature radius of the object side surface of the first lens L1 is R2, R1 and R2 satisfy the following relational expression: $-0.44 \leq (R1+R2)/(R1-R2) \leq -0.13$, which reasonably controls the shape of the first lens, so that the first lens can effectively correct the spherical aberration of the system. Optionally, $-0.28 \leq (R1+R2)/(R1-R2) \leq -0.17$.

An on-axis thickness of the first lens L1 is defined as d1, which satisfies the following relational expression: $0.02 \leq d1/TTL \leq 0.11$, it is beneficial to achieving the ultra-thin design. Optionally, $0.04 \leq d1/TTL \leq 0.09$.

In this embodiment, the exit pupil surface of the second lens L2 is concave in the paraxial region, and the object side surface of the second lens L2 is convex in the paraxial region. The second lens L2 has a negative refractive power.

The focal length of the second lens L2 is defined as f2, and f2, f satisfy the following relational expression: −0.74≤f2/f≤−0.22, which is beneficial to correcting the aberration of the optical system by controlling the positive refractive power of the second lens L2 within a reasonable range. Optionally, −0.47≤f2/f≤−0.27.

A central curvature radius of the exit pupil surface of the second lens L2 is R3, and a central curvature radius of the object side surface of the second lens L2 is R4, R3 and R4 satisfy the following relational expression: −3.86≤(R3+R4)/(R3−R4)≤−0.71, which specifies the shape of the second lens L2, and within the range, it is beneficial to correct the on-axis chromatic aberration, while approaching ultra-thin and wide-angle design of the lens. Optionally, −2.41≤(R3+R4)/(R3−R4)≤−0.89.

An on-axis thickness of the second lens L2 is defined as d3, d3 satisfies the following relational expression: 0.01≤d3/TTL≤0.12, which is beneficial to achieving the ultra-thin design. Optionally, 0.01≤d3/TTL≤0.10.

In this embodiment, the exit pupil surface of the third lens L3 is concave in the paraxial region, and the object side surface of the third lens L3 is convex in the paraxial region. The third lens L3 has a positive refractive power.

A central curvature radius of the exit pupil surface of the third lens L3 is R5, and a central curvature radius of the object side surface of the third lens L3 is R6, R5 and R6 satisfy the following relational expression: 1.25≤(R5+R6)/(R5−R6)≤20.05, which can effectively control the shape of the third lens L3, facilitating the formation of the third lens L3 and avoiding defects and stress generation caused by excessive surface curvature of the third lens L3. Optionally, 1.99≤(R5+R6)/(R5−R6)≤16.04.

An on-axis thickness of the third lens L3 is defined as d5, and d5, TTL satisfy the following relational expression: 0.00≤d5/TTL≤0.02, which is beneficial to achieving the ultra-thin design. Optionally, 0.01≤d5/TTL≤0.02.

In this embodiment, the exit pupil surface of the fourth lens L4 is concave in the paraxial region, and the object side surface of the fourth lens L4 is concave in the paraxial region. The fourth lens L4 has a negative refractive power. In the other embodiments, the exit pupil surface and the object side surface of the fourth lens L4 may also have other concave or convex distributions.

A focal length of the fourth lens L4 is defined as f4, and f4, f satisfy the following relational expression: −0.37≤f4/f≤−0.09. Through the reasonable distribution of refractive power, the system has better imaging quality and lower sensitivity. Optionally, −0.23≤f4/f≤−0.11.

A central curvature radius of an exit pupil surface of the fourth lens L4 is defined as R7 and a central curvature radius of an object side surface of the fourth lens L4 is defined as R8, R7 and R8 satisfy the following relational expression: −6.00≤(R7+R8)/(R7−R8)≤−0.65, which specifies the shape of the fourth lens L4, and within the range, it is beneficial to correct the problems such as the aberration of off-axis angles, while approaching the ultra-thin and wide-angle design of the lens. Optionally, −3.75≤(R7+R8)/(R7−R8)≤−0.81.

An on-axis thickness of the fourth lens L4 is defined as d7, d7 and TTL satisfy the following relational expression: 0.01≤d7/TTL≤0.12, which specifies the ratio of the on-axis thickness of the fourth lens L4 to the total optical length TTL of the microscope objective 10, which is beneficial to achieving the ultra-thin design. Optionally, 0.01≤d7/TTL≤0.10.

In this embodiment, the exit pupil surface of the fifth lens L5 is convex in the paraxial region, and the object side surface of the fifth lens L5 is convex in the paraxial region. The fifth lens L5 has a positive refractive power.

The focal length of the fifth lens L5 is defined as f5, f5 and f satisfy the following relational expression: 0.21≤f5/f≤1.09. The above limitation of the fifth lens L5 can effectively flatten the light angle of the microscope lens and reduce tolerance sensitivity. Optionally, 0.34≤f5/f≤0.87.

A central curvature radius of an exit pupil surface of the fifth lens L5 is defined as R9 and a central curvature radius of an object side surface of the fifth lens L5 is defined as R10, R9 and R10 satisfy the following relational expression: −1.33≤(R9+R10)/(R9−R10)≤−0.13, which specifies the shape of the fifth lens L5, within the condition range, it is beneficial to correct the problems such as the aberration of off-axis angles while approaching the ultra-thin and wide-angle design of the lens. Optionally, −0.83≤(R9+R10)/(R9−R10)≤−0.17.

An on-axis thickness of the fifth lens L5 is defined as d9, d9 and TTL satisfy the following relational expression: 0.01≤d9/TTL≤0.12, which is beneficial to achieving the ultra-thin design. Optionally, 0.02≤d9/TTL≤0.10.

In this embodiment, the total optical length TTL of the microscope objective 10 is less than or equal to 136.25 mm, which is beneficial to achieving the ultra-thin design.

In this embodiment, the F number of the microscope objective 10 is less than or equal to 12.83. The imaging performance is good.

In this embodiment, the first lens, the second lens, the third lens, the fourth lens and the fifth lens are all made of glass.

The microscope objective 10 of the present disclosure will be described as follows by using the examples. The symbols recited in the examples are as follows. The units of the focal length, the on-axis distance, the central curvature radius and the on-axis thickness are mm.

TTL: optical length (an on-axis distance from the exit pupil surface of the first lens L1 to the object plane OBJ) is measured in mm.

Specific embodiments are described as follows.

Table 1 shows the design data of the microscope objective 10 according to the first embodiment of the present disclosure.

TABLE 1

Design Data for Microscope Objective 10

| | | R | | d | | Nd | | vd |
|---|---|---|---|---|---|---|---|---|
| ST | | INF | dST | 0 | | | | |
| L1 | R1 | 18.189 | d1 | 5.020 | n1 | 1.4378 | v1 | 94.52 |
| | R2 | −27.749 | d2 | 1.110 | | | | |
| L2 | R3 | −25.439 | d3 | 1.000 | n2 | 1.7292 | v2 | 54.67 |
| | R4 | −100.395 | d4 | 23.070 | | | | |
| L3 | R5 | −80.931 | d5 | 1.340 | n3 | 1.6477 | v3 | 33.84 |
| | R6 | −34.573 | d6 | 2.030 | | | | |
| L4 | R7 | −13.703 | d7 | 1.000 | n4 | 1.7725 | v4 | 49.61 |
| | R8 | 896.557 | d8 | 36.110 | | | | |
| L5 | R9 | 58.456 | d9 | 2.950 | n5 | 1.7433 | v5 | 49.24 |
| | R10 | −148.914 | d10 | 24.918 | | | | |

The meaning of each symbol is as follows.

ST: aperture;

R: central curvature radius at the center of the optical surface;

R1: central curvature radius of the exit pupil surface of the first lens L1;

R2: central curvature radius of the object side surface of the first lens L1;

R3: central curvature radius of the exit pupil surface of the second lens L2;

R4: central curvature radius of the object side surface of the second lens L2;

R5: central curvature radius of the exit pupil surface of the third lens L3;

R6: central curvature radius of the object side surface of the third lens L3;

R7: central curvature radius of the exit pupil surface of the fourth lens L4;

R8: central curvature radius of the object side surface of the fourth lens L4;

R9: central curvature radius of the exit pupil surface of the fifth lens L5;

R10: central curvature radius of the object side surface of the fifth lens L5;

d: on-axis thickness of lens, on-axis distance between lenses;

dST: on-axis thickness of aperture ST;

d1: on-axis thickness of the first lens L1;

d2: on-axis distance from the object side surface of the first lens L1 to the exit pupil surface of the second lens L2;

d3: on-axis thickness of the second lens L2;

d4: on-axis distance from the object side surface of the second lens L2 to the exit pupil surface of the third lens L3;

d5: on-axis thickness of the third lens L3;

d6: on-axis distance from the object side surface of the third lens L3 to the exit pupil surface of the fourth lens L4;

d7: on-axis thickness of the fourth lens L4;

d8: on-axis distance from the object side surface of the fourth lens L4 to the exit pupil surface of the fifth lens L5;

d9: on-axis thickness of the fifth lens L5;

d10: on-axis distance from the object side surface of the fifth lens L5 to the object plane;

Nd: refractive index of d line;

N1: refractive index of d line of the first lens L1;

N2: refractive index of d line of the second lens L2;

N3: refractive index of d line of the third lens L3;

N4: refractive index of d line of the fourth lens L4;

N5: refractive index of d line of the fifth lens L5;

vd: Abbe number;

v1: Abbe number of the first lens L1;

v2: Abbe number of the second lens L2;

v3: Abbe number of the third lens L3;

v4: Abbe number of the fourth lens L4;

v5: Abbe number of the fifth lens L5.

Figure 2:
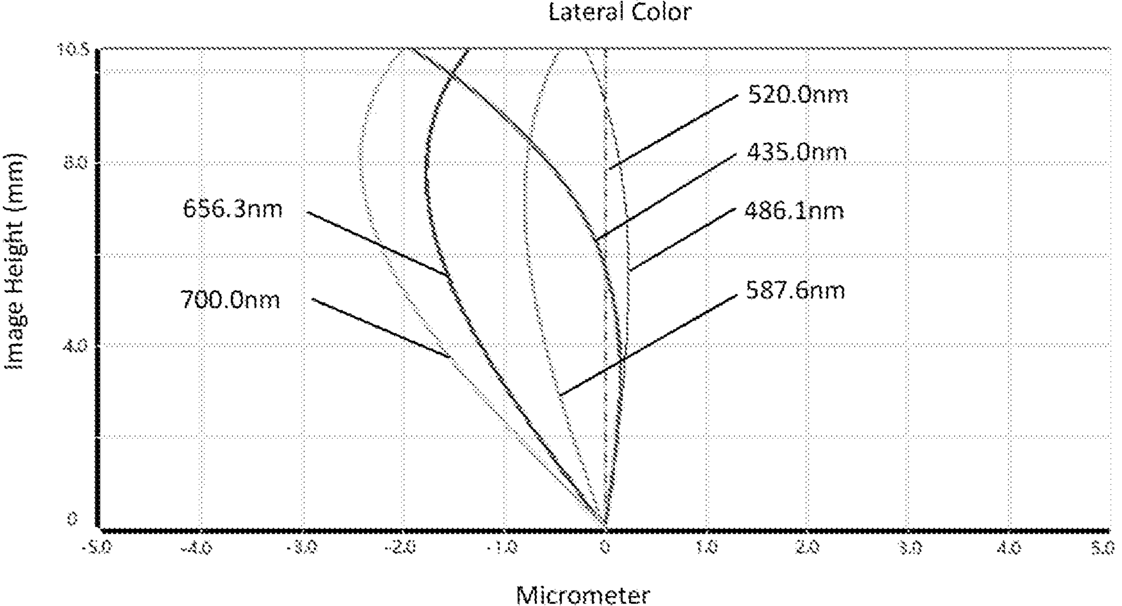
FIG. 2 is a schematic diagram of a lateral color of the microscope objective shown in FIG. 1.
Figure 3:
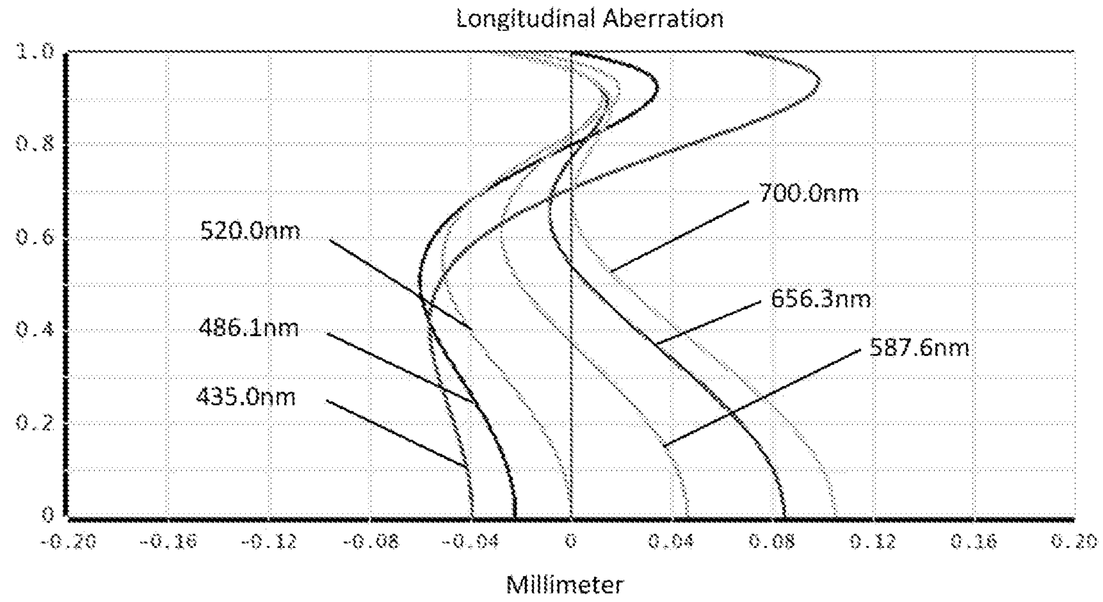
FIG. 3 is a schematic diagram of a longitudinal aberration of the microscope objective shown in FIG. 1.
Figure 4:
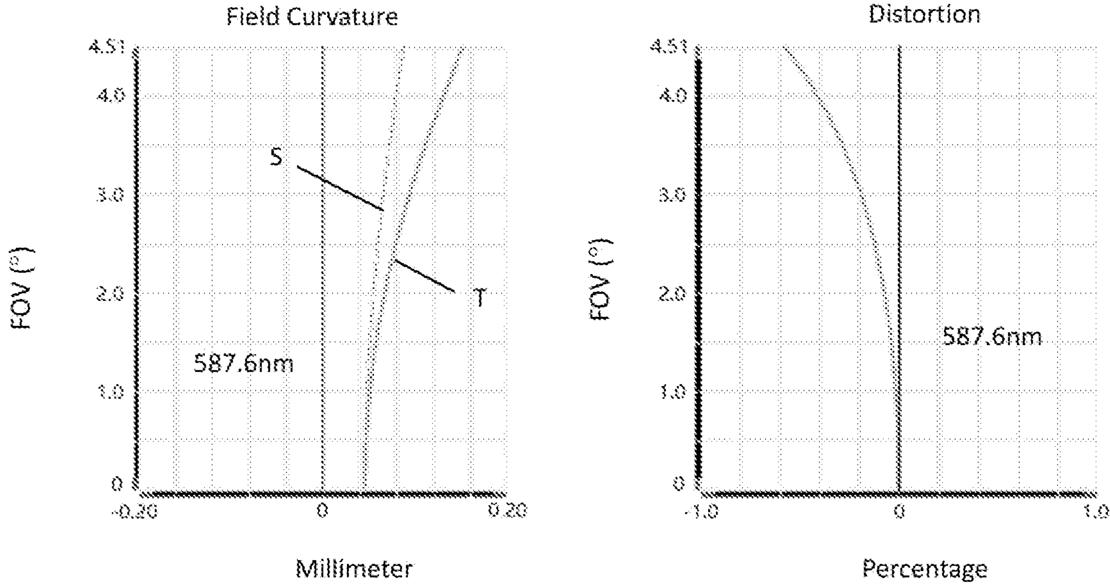
FIG. 4 is a schematic diagram of a field curvature and distortion of the microscope objective shown in FIG. 1.

FIG. 2 and FIG. 3 are schematic diagrams showing lateral color and longitudinal aberration of the light with wavelengths of 486.1 nm, 587.6 nm, 656.3 nm, 520.0 nm, 435.0 nm and 700.0 nm after passing through the microscope objective 10 of the first embodiment. FIG. 4 shows field curvature and distortion of the light with a wavelength of 587.6 nm after passing through the microscope objective 10 of the first embodiment, the field curvature S in FIG. 4 is a field curvature in a sagittal direction, and T is a field curvature in a tangential direction.

The following Table 5 shows various values in Embodiment 1, Embodiment 2, Embodiment 3, and Embodiment 4 and values corresponding to parameters specified in the relational expression.

As shown in Table 5, the first embodiment satisfies each relational expression.

In this embodiment, the entrance pupil diameter ENPD of the microscope objective 10 is 16.100 mm, the full field-of-view image height IH is 10.500 mm, the field-of-view FOV in the diagonal direction is 9.02°, the numerical aperture NA is 0.06000 mm, the operating distance is long, its on-axis and off-axis chromatic aberrations are fully corrected, and the objective has excellent optical characteristics.

Embodiment 2

Figure 5:
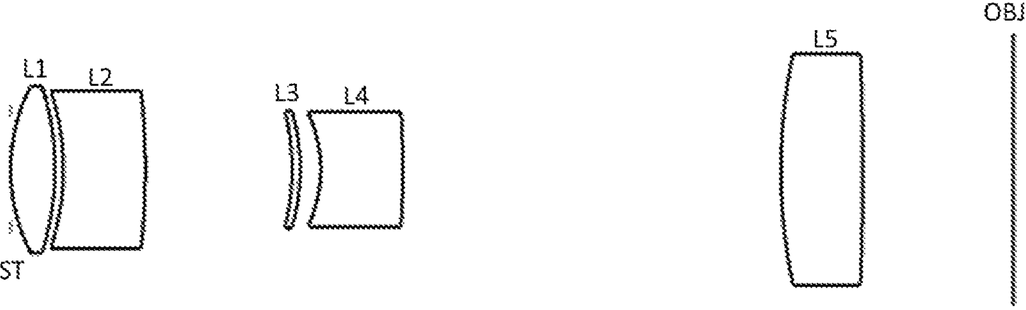
FIG. 5 is a structural schematic diagram of a microscope objective according to a second embodiment of the present disclosure.

The second embodiment is basically the same as the first embodiment, with the same symbol meaning as the first embodiment. The difference is that in the second embodiment, the exit pupil surface of the fourth lens L4 is concave in the paraxial region, and the object side surface of the fourth lens L4 is convex in the paraxial region. The structure of the microscope objective 20 of the second embodiment is shown in FIG. 5, and only differences are listed below.

Table 2 shows design data of the microscope objective 20 according to the second embodiment of the present disclosure.

TABLE 2

Design Data for Microscope Objective 20

| | | R | | d | | Nd | | vd |
|---|---|---|---|---|---|---|---|---|
| ST | | INF | dST | 0 | | | | |
| L1 | R1 | 17.456 | d1 | 5.636 | n1 | 1.4378 | v1 | 94.52 |
| | R2 | −27.367 | d2 | 0.914 | | | | |
| L2 | R3 | −25.572 | d3 | 10.000 | n2 | 1.7364 | v2 | 59.74 |
| | R4 | −80.456 | d4 | 11.046 | | | | |
| L3 | R5 | −28.316 | d5 | 1.000 | n3 | 1.6477 | v3 | 33.84 |
| | R6 | −24.374 | d6 | 5.995 | | | | |
| L4 | R7 | −12.687 | d7 | 10.000 | n4 | 1.7725 | v4 | 49.61 |
| | R8 | −66.735 | d8 | 52.323 | | | | |
| L5 | R9 | 60.921 | d9 | 8.375 | n5 | 1.7433 | v5 | 49.24 |
| | R10 | −304.607 | d10 | 18.574 | | | | |

Figure 6:
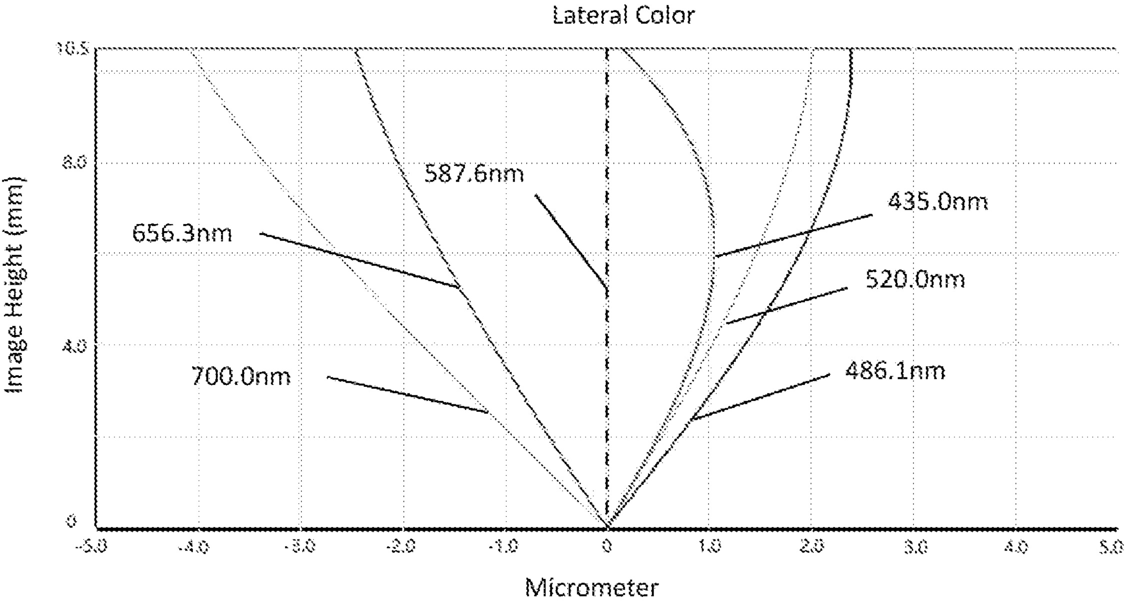
FIG. 6 is a schematic diagram of a lateral color of the microscope objective shown in FIG. 5.
Figure 7:
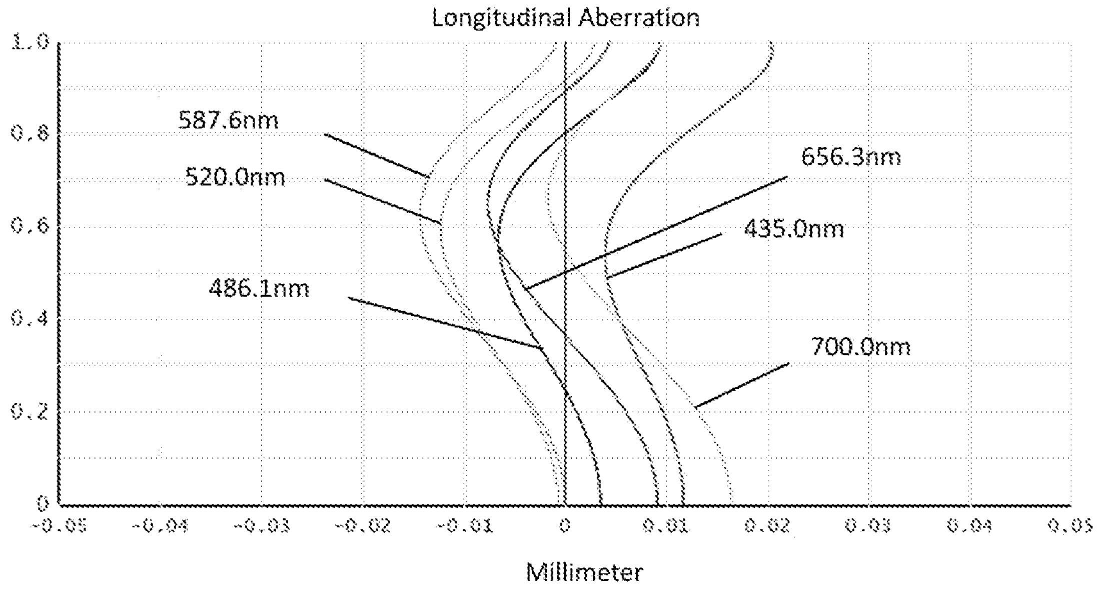
FIG. 7 is a schematic diagram of a longitudinal aberration of the microscope objective shown in FIG. 5.
Figure 8:
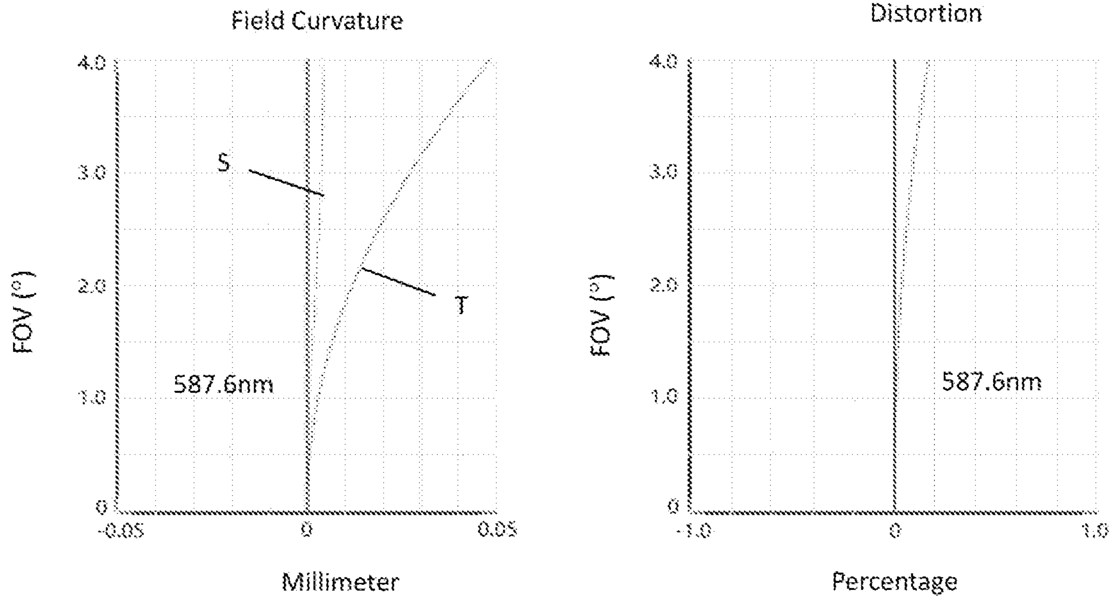
FIG. 8 is a schematic diagram of a field curvature and distortion of the microscope objective shown in FIG. 5.

FIG. 6 and FIG. 7 are schematic diagrams showing lateral color and longitudinal aberration of the light with wavelengths of 486.1 nm, 587.6 nm, 656.3 nm, 520.0 nm, 435.0 nm and 700.0 nm after passing through the microscope objective 20 of the second embodiment. FIG. 8 shows field curvature and distortion of the light with a wavelength of 587.6 nm after passing through the microscope objective 20 of the second embodiment, the field curvature S in FIG. 8 is the field curvature in the sagittal direction, and T is the field curvature in the tangential direction.

As shown in Table 5, the second embodiment satisfies each relational expression.

In this embodiment, the entrance pupil diameter of the microscope objective 20 is 12.000 mm, the full field of view image height is 10.500 mm, the field of view in the diagonal direction is 8.02°, the numerical aperture NA is 0.04000 mm, the operating distance is long, its on-axis and off-axis chromatic aberrations are fully corrected, and the objective has excellent optical characteristics.

Embodiment 3

Figure 9:
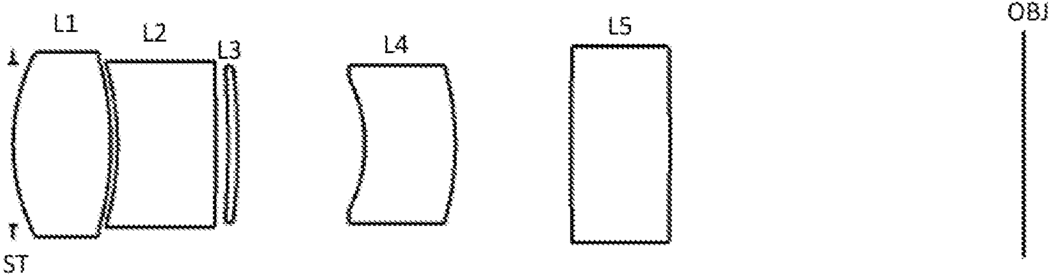
FIG. 9 is a structural schematic diagram of a microscope objective according to a third embodiment of the present disclosure.

The third embodiment is basically the same as the first embodiment, with the same symbol meaning as the first embodiment. The difference is that in the third embodiment, the exit pupil surface of the fourth lens L4 is concave in the paraxial region, and the object side surface of the fourth lens L4 is convex in the paraxial region. The structural form of the microscope objective 30 of the third embodiment is shown in FIG. 9, and only differences are listed below.

Table 3 shows design data of the microscope objective 30 according to the third embodiment of the present disclosure.

TABLE 3

Design Data for Microscope Objective 30

| | | R | | d | | Nd | | vd |
|---|---|---|---|---|---|---|---|---|
| ST | | INF | dST | 0 | | | | |
| L1 | R1 | 17.302 | d1 | 9.899 | n1 | 1.4378 | v1 | 94.52 |
| | R2 | −25.866 | d2 | 0.661 | | | | |
| L2 | R3 | −25.004 | d3 | 9.923 | n2 | 1.7292 | v2 | 54.67 |
| | R4 | −770.228 | d4 | 1.246 | | | | |
| L3 | R5 | −94.145 | d5 | 1.000 | n3 | 1.6477 | v3 | 33.84 |
| | R6 | −56.237 | d6 | 12.877 | | | | |
| L4 | R7 | −12.311 | d7 | 9.151 | n4 | 1.7725 | v4 | 49.61 |
| | R8 | −24.634 | d8 | 11.706 | | | | |
| L5 | R9 | 271.800 | d9 | 9.999 | n5 | 1.7433 | v5 | 49.24 |
| | R10 | −407.702 | d10 | 35.795 | | | | |

Figure 10:
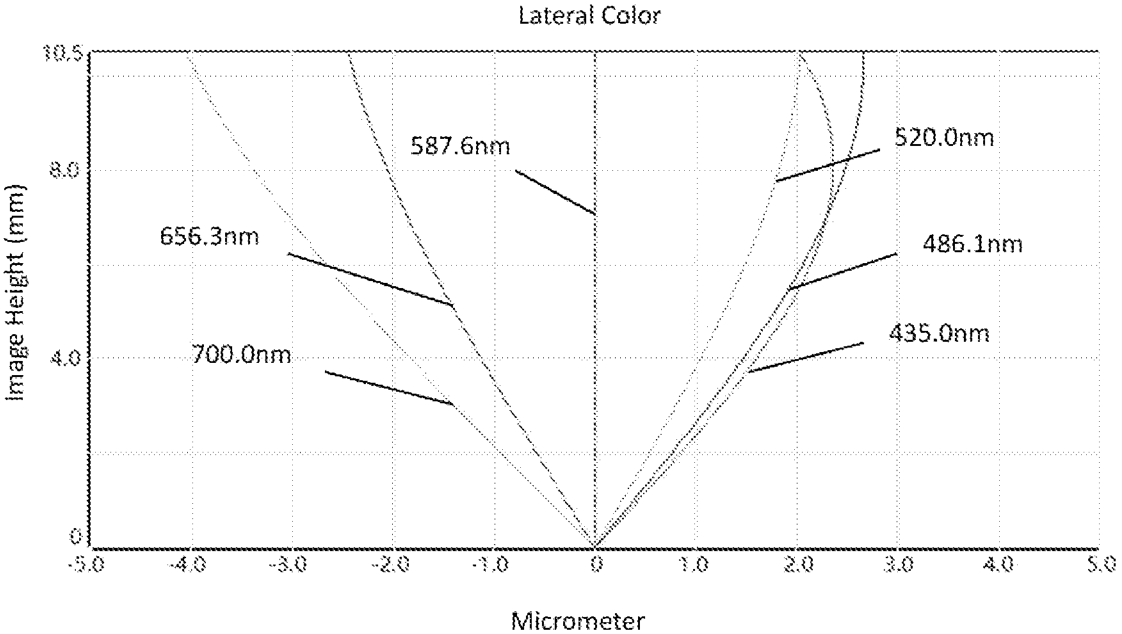
FIG. 10 is a schematic diagram of a lateral color of the microscope objective shown in FIG. 9.
Figure 11:
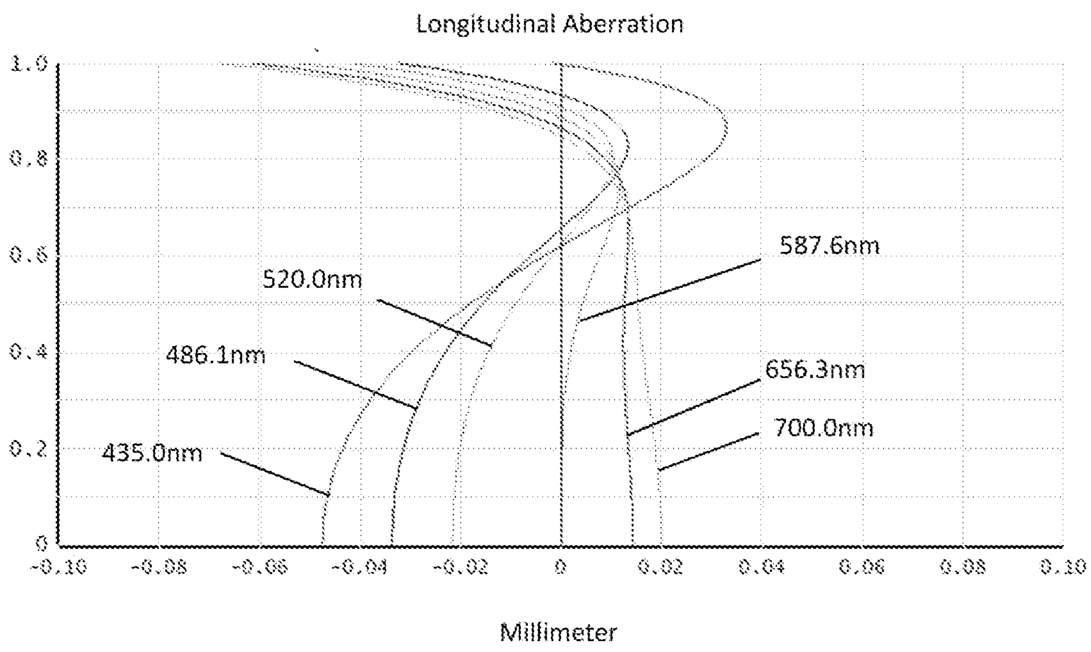
FIG. 11 is a schematic diagram of a longitudinal aberration of the microscope objective shown in FIG. 9.
Figure 12:
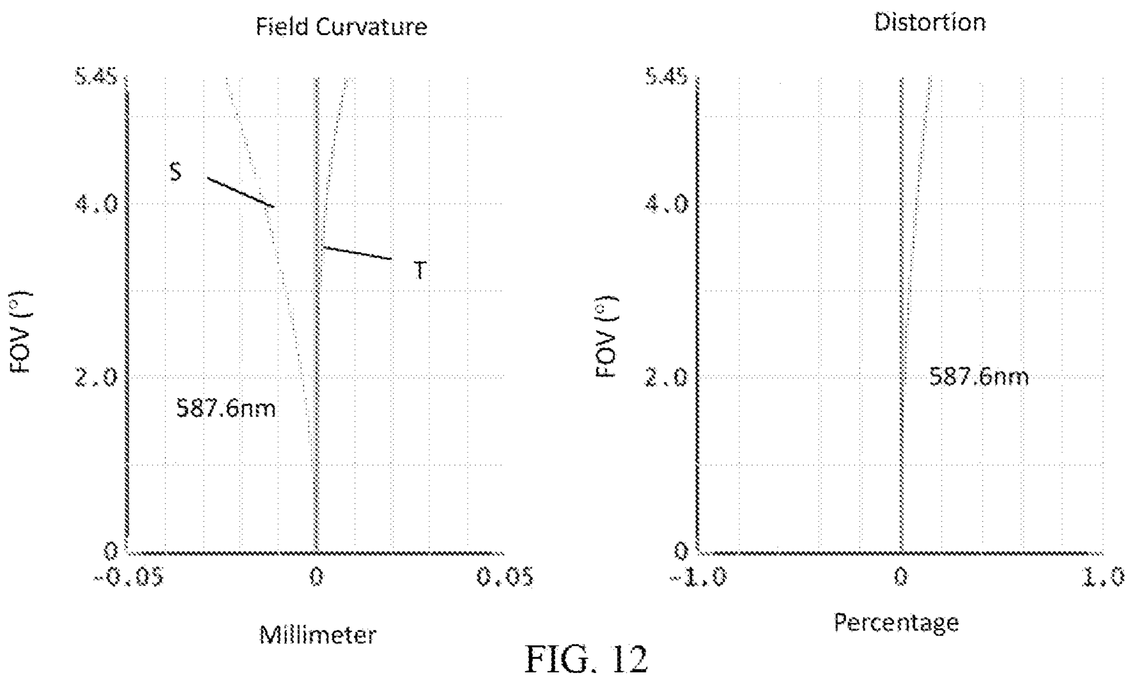
FIG. 12 is a schematic diagram of a field curvature and distortion of the microscope objective shown in FIG. 9.

FIG. 10 and FIG. 11 are schematic diagrams showing lateral color and longitudinal aberration of the light with wavelengths of 486.1 nm, 587.6 nm, 656.3 nm, 520.0 nm, 435.0 nm and 700.0 nm after passing through the microscope objective 30 of the third embodiment. FIG. 12 shows field curvature and distortion of the light with a wavelength of 587.6 nm after passing through the microscope objective 30 according to the third embodiment, the field curvature S in FIG. 12 is a field curvature in a sagittal direction, and T is a field curvature in a tangential direction.

As shown in Table 5, the third embodiment satisfies each relational expression.

In this embodiment, the entrance pupil diameter of the microscope objective 30 is 12.000 mm, the full field of view image height is 10.500 mm, the field of view in the diagonal direction is 8.02°, the operating distance is long, the numerical aperture NA is 0.06800 mm, its on-axis and off-axis chromatic aberrations are fully corrected, and the objective has excellent optical characteristics.

Embodiment 4

Figure 13:
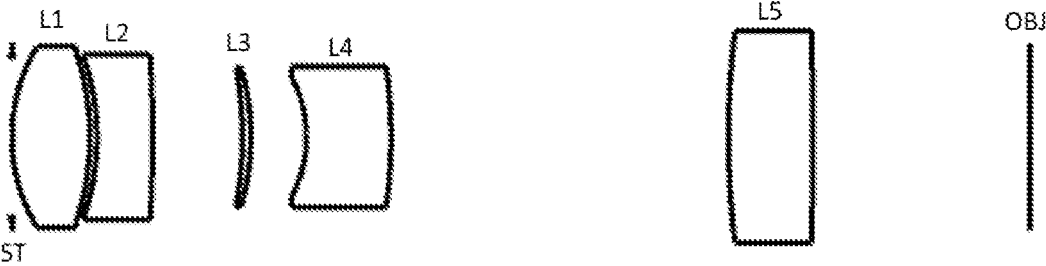
FIG. 13 is a structural schematic diagram of a microscope objective according to a fourth embodiment of the present disclosure.

The fourth embodiment is basically the same as the first embodiment, with the same symbol meaning as the first embodiment. The difference is that in the fourth embodiment, the exit pupil surface of the fourth lens L4 is concave in the paraxial region, and the object side surface of the fourth lens L4 is convex in the paraxial region. The structural form of the microscope objective 40 of the fourth embodiment is shown in FIG. 13, and only differences are listed below.

Table 4 shows design data of the microscope objective 40 according to the fourth embodiment of the present disclosure.

TABLE 4

Design Data for Microscope Objective 40

| | | R | | d | | Nd | | vd |
|---|---|---|---|---|---|---|---|---|
| ST | | INF | dST | 0 | | | | |
| L1 | R1 | 18.644 | d1 | 9.253 | n1 | 1.4378 | v1 | 94.52 |
| | R2 | −28.145 | d2 | 0.843 | | | | |
| L2 | R3 | −26.335 | d3 | 6.590 | n2 | 1.7292 | v2 | 54.67 |
| | R4 | −133.706 | d4 | 10.642 | | | | |
| L3 | R5 | −40.125 | d5 | 1.000 | n3 | 1.6477 | v3 | 33.84 |
| | R6 | −26.808 | d6 | 6.595 | | | | |
| L4 | R7 | −13.680 | d7 | 10.000 | n4 | 1.7725 | v4 | 49.61 |
| | R8 | −56.002 | d8 | 40.000 | | | | |
| L5 | R9 | 90.690 | d9 | 10.000 | n5 | 1.7433 | v5 | 49.24 |
| | R10 | −452.080 | d10 | 25.789 | | | | |

Figure 14:
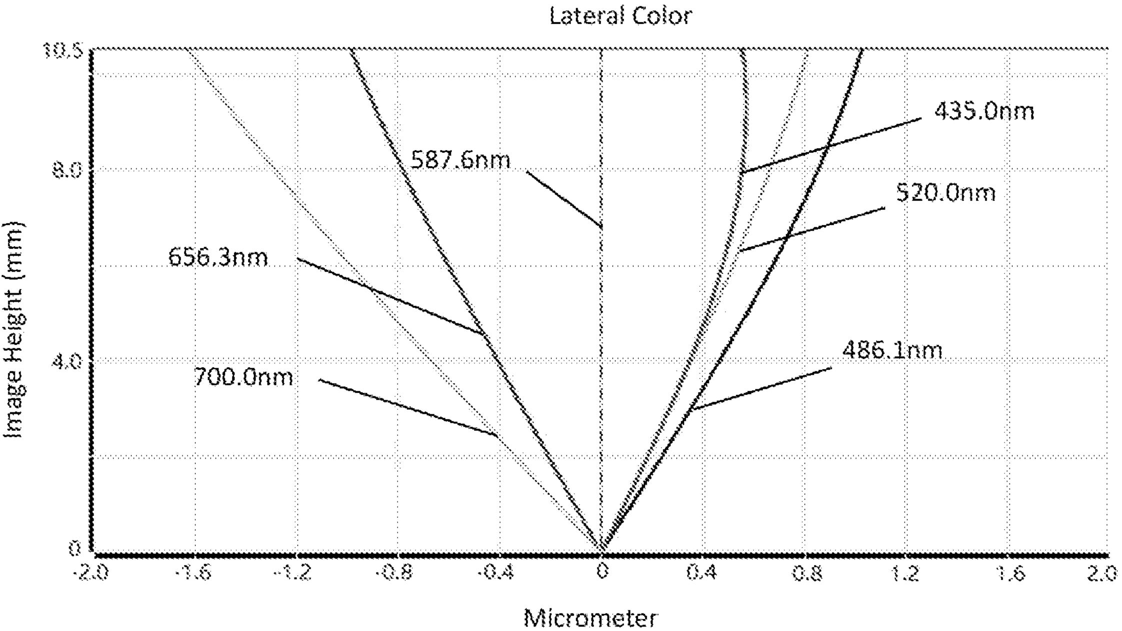
FIG. 14 is a schematic diagram of a lateral color of the microscope objective shown in FIG. 13.
Figure 15:
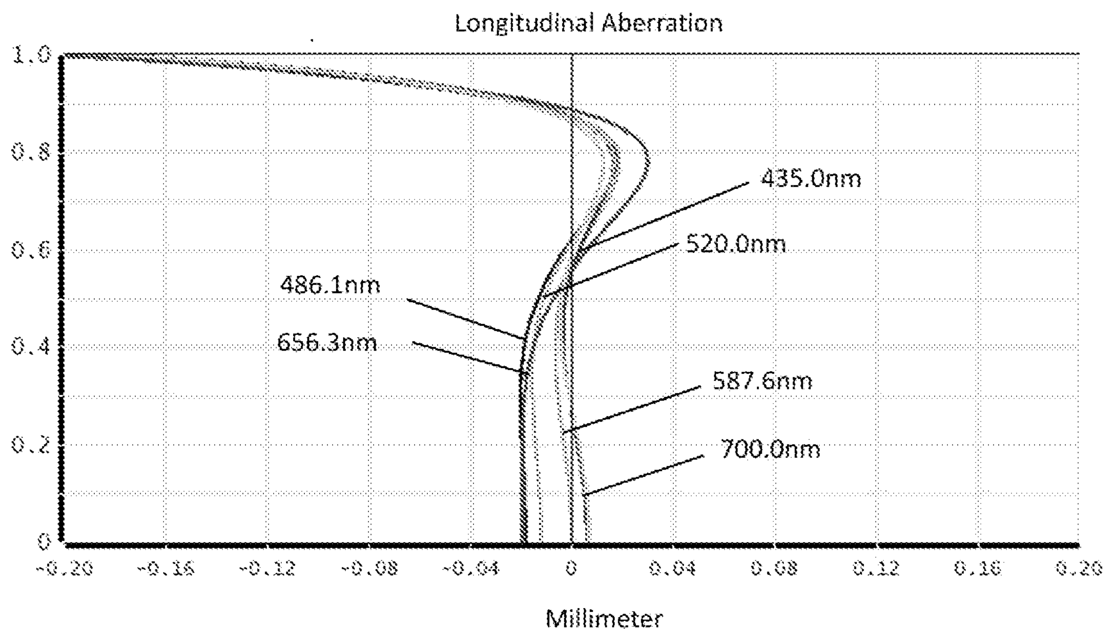
FIG. 15 is a schematic diagram of a longitudinal aberration of the microscope objective shown in FIG. 13.
Figure 16:
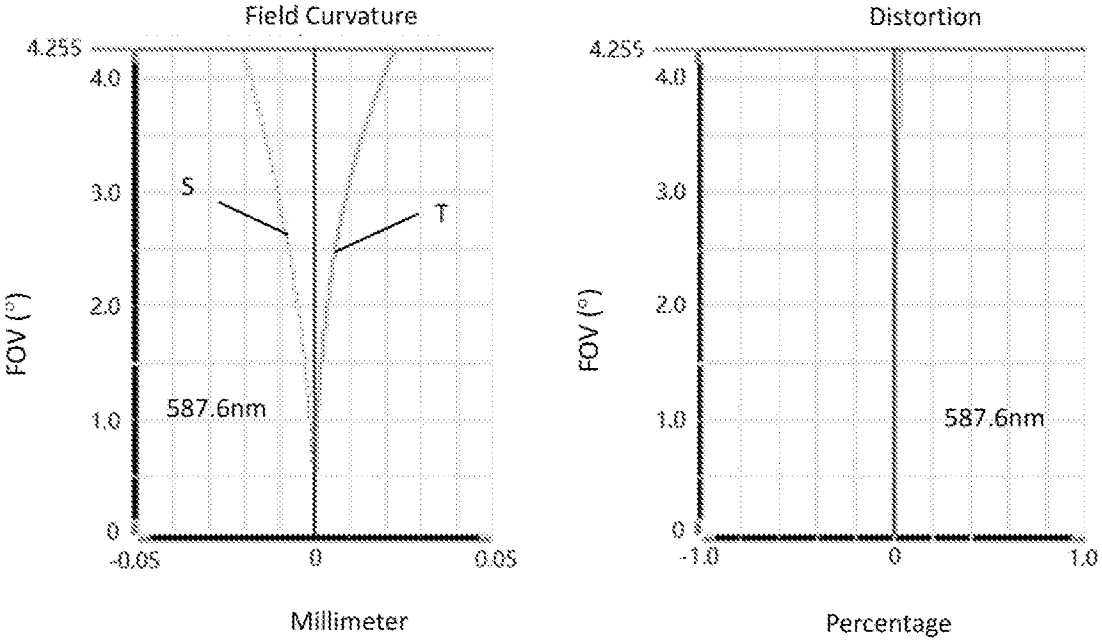
FIG. 16 is a schematic diagram of a field curvature and distortion of the microscope objective shown in FIG. 13.

FIG. 14 and FIG. 15 are schematic diagrams showing lateral color and longitudinal aberration of the light with wavelengths of 486.1 nm, 587.6 nm, 656.3 nm, 520.0 nm, 435.0 nm and 700.0 nm after passing through the microscope objective 40 according to the fourth embodiment. FIG. 16 shows field curvature and distortion of the light with a wavelength of 587.6 nm after passing through the microscope objective 40 according to the fourth embodiment, the field curvature S in FIG. 16 is a field curvature in a sagittal direction, and T is a field curvature in a tangential direction.

As shown in Table 5, the fourth embodiment satisfies each relational expression.

In this embodiment, the entrance pupil diameter of the microscope objective 40 is 18.000 mm, the full field of view image height is 10.500 mm, the field of view in the diagonal direction is 8.51°, the operating distance is long, the numerical aperture NA is 0.06366 mm, its on-axis and off-axis chromatic aberrations are fully corrected, and the objective has excellent optical characteristics.

TABLE 5

Values corresponding to various values in each embodiment and the parameters specified in the relational expressions

| Parameters and relational expressions | Embodiment 1 | Embodiment 2 | Embodiment 3 | Embodiment 4 |
|---|---|---|---|---|
| f3/f | 0.683 | 1.644 | 1.644 | 0.859 |
| f2/f1 | −1.80 | −2.20 | −2.20 | −1.69 |
| f | 133.197 | 149.509 | 149.509 | 141.086 |
| f1 | 25.849 | 25.313 | 25.313 | 27.258 |
| f2 | −46.638 | −55.689 | −55.689 | −46.170 |
| f3 | 91.007 | 245.833 | 245.833 | 121.135 |
| f4 | −17.317 | −22.057 | −22.057 | −26.123 |
| f5 | 56.343 | 68.974 | 68.974 | 102.428 |
| Fno | 8.27 | 12.45 | 12.45 | 7.83 |
| TTL | 98.548 | 123.863 | 123.863 | 120.712 |
| IH | 10.500 | 10.500 | 10.500 | 10.500 |
| FOV | 9.02° | 8.02° | 8.02° | 8.51° |
| NA | 0.06000 | 0.04000 | 0.06800 | 0.06366 |

Those skilled in the art can understand that the above embodiments are specific embodiments for implementing the present disclosure, and in practical applications, various changes may be made in form and detail without departing from the spirit and scope of the present disclosure.

What is claimed is:

1. A microscope objective, comprising from an exit pupil plane to an object plane: a first lens having a positive refractive power, a second lens having a negative refractive power, a third lens having a positive refractive power, a fourth lens having a negative refractive power, and a fifth lens having a positive refractive power;

wherein a focal length of the microscope objective is f, a focal length of the first lens is f1, a focal length of the second lens is f2, a focal length of the third lens is f3, an on-axis distance from the object plane of the microscope objective to an object side surface of the fifth lens is WD, a numerical aperture of the microscope objective is NA, and a total optical length of the microscope objective is TTL satisfy following relational expressions:

$$0.68 \leq f3/f \leq 2.00;$$

$$-2.20 \leq f2/f1 \leq -140;$$

$$0.15 \leq WD/TTL \leq 0.35;$$

$$6.00 \leq f*NA \leq 9.00.$$

2. The microscope objective as described in claim 1, wherein an Abbe number of the first lens is v1, and an Abbe number of the second lens is v2, a following relational expression is satisfied:

$$35.00 \leq v1 - v2.$$

3. The microscope objective as described in claim 1, wherein a central curvature radius of an exit pupil surface of the fifth lens is R9, and a central curvature radius of an object side surface of the fifth lens is R10, a following relational expression is satisfied:

$$-5.00 \leq R10/R9 \leq -150.$$

4. The microscope objective as described in claim 1, wherein an exit pupil surface of the first lens is convex in a paraxial region, and an object side surface of the first lens is convex in a paraxial region;

a central curvature radius of the exit pupil surface of the first lens is R1, a central curvature radius of the object side surface of the first lens is R2, and an on-axis thickness of the first lens is d1, following relational expressions are satisfied:

$$0.08 \leq f1/f \leq 0.29;$$

$$-0.44 \leq (R1 + R2)/(R1 - R2) \leq -0.13;$$

$$0.02 \leq d1/TTL \leq 0.11.$$

5. The microscope objective as described in claim 1, wherein an exit pupil surface of the second lens is concave in a paraxial region, and an object side surface of the second lens is convex in a paraxial region;

an on-axis thickness of the second lens is d3, a central curvature radius of the exit pupil surface of the second lens is R3, and a central curvature radius of the object side surface of the second lens is R4, following relational expression are satisfied:

$$-0.74 \leq f2/f \leq -0.22;$$

$$-3.86 \leq (R3 + R4)/(R3 - R4) \leq -0.71;$$

$$0.01 \leq d3/TTL \leq 0.12.$$

6. The microscope objective as described in claim 1, wherein an exit pupil surface of the third lens is concave in a paraxial region, and an object side surface of the third lens is convex in a paraxial region;

a central curvature radius of the exit pupil surface of the third lens is R5, a central curvature radius of the object side surface of the third lens is R6, and an on-axis thickness of the third lens is d5, following relational expressions are satisfied:

$$1.25 \leq (R5 + R6)/(R5 - R6) \leq 20.05;$$

$$0.00 \leq d5/TTL \leq 0.02.$$

7. The microscope objective as described in claim 1, wherein a focal length of the fourth lens is f4, a central curvature radius of an exit pupil surface of the fourth lens is R7, a central curvature radius of an object side surface of the fourth lens is R8, and an on-axis thickness of the fourth lens is d7, following relational expressions are satisfied:

$$-0.37 \leq f4/f \leq -0.09;$$

$$-6.00 \leq (R7 + R8)/(R7 - R8) \leq -0.65;$$

$$0.01 \leq d7/TTL \leq 0.12.$$

8. The microscope objective as described in claim 1, wherein an exit pupil surface of the fifth lens is convex in a paraxial region, and an object side surface of the fifth lens is convex in a paraxial region;

a focal length of the fifth lens is f5, and an on-axis thickness of the fifth lens is d9, following relational expressions are satisfied:

$$0.21 \leq f5/f \leq 1.09;$$

$$0.01 \leq d9/TTL \leq 0.12.$$

9. The microscope objective as described in claim 1, wherein the first lens, the second lens, the third lens, the fourth lens, and the fifth lens are all made of glass.

* * * * *